(12) United States Patent
Hashiguchi

(10) Patent No.: US 9,076,067 B2
(45) Date of Patent: Jul. 7, 2015

(54) INFORMATION PROCESSING APPARATUS AND METHOD FOR CLASSIFIER-BASED OBJECT DETECTION

(75) Inventor: Noriyasu Hashiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 12/970,718

(22) Filed: Dec. 16, 2010

(65) Prior Publication Data

US 2011/0158544 A1 Jun. 30, 2011

(30) Foreign Application Priority Data

Dec. 24, 2009 (JP) ................................. 2009-292941

(51) Int. Cl.
- *G06K 9/46* (2006.01)
- *G06K 9/66* (2006.01)
- *G06K 9/50* (2006.01)
- *G06K 9/00* (2006.01)
- *G06K 9/62* (2006.01)

(52) U.S. Cl.
CPC .......... *G06K 9/4647* (2013.01); *G06K 9/00228* (2013.01); *G06K 9/4614* (2013.01); *G06K 9/4642* (2013.01); *G06K 9/6257* (2013.01)

(58) Field of Classification Search
CPC .................................................... G06K 9/4647
See application file for complete search history.

(56) References Cited

U.S. PATENT DOCUMENTS

| | | | | |
|---|---|---|---|---|
| 8,295,610 | B1 * | 10/2012 | Brunner ........................ | 382/201 |
| 8,315,473 | B1 * | 11/2012 | Tao et al. ..................... | 382/260 |
| 2002/0102024 | A1 * | 8/2002 | Jones et al. .................. | 382/225 |
| 2003/0063773 | A1 | 4/2003 | Muramatsu et al. .......... | 382/104 |
| 2008/0049029 | A1 | 2/2008 | Kurata et al. ................. | 345/519 |
| 2011/0058741 | A1 * | 3/2011 | Ito et al. ....................... | 382/173 |

FOREIGN PATENT DOCUMENTS

| | | |
|---|---|---|
| CN | 101183428 | 5/2008 |
| CN | 101187984 | 5/2008 |
| CN | 101196984 | 6/2008 |

(Continued)

OTHER PUBLICATIONS

Lai, H.C., Savvides, M., and Chen, T., Proposed FPGA Hardware Architecture for High Frame Rate (>100 fps) Face Detection Using Feature Cascade Classifiers, Sep. 27-29, 2007, BTAS 2007 First IEEE International Conference on Biometrics: Theory, Applications, and Systems, 2007., pp. 1-6.*

(Continued)

*Primary Examiner* — Stephen R Koziol
*Assistant Examiner* — Jonathan S Lee
(74) *Attorney, Agent, or Firm* — Fitzpatrick, Cella, Harper & Scinto

(57) ABSTRACT

An information processing apparatus includes an information input section that reads input image information, a cumulative image information generator that generates cumulative image information for pixels corresponding to positions of pixels of a prescribed pixel pattern in the read input image information, and a memory controller that stores in the cumulative image information holding memory the cumulative image information generated in the cumulative image information generator. This configuration allows memory resources necessary for holding the cumulative image information to be reduced.

8 Claims, 13 Drawing Sheets

(56) References Cited

FOREIGN PATENT DOCUMENTS

| JP | 2003-115986 | 4/2003 |
|---|---|---|
| WO | 2008/146934 | 12/2008 |

OTHER PUBLICATIONS

Cho, J., Benson, B., Mirzaei, S., and Kastner, R. Parallelized Architecture of Multiple Classifiers for Face Detection, Jul. 7-9, 2009. 20th IEEE International Conference on Application-specific Systems, Architectures and Processors, 2009., pp. 75-82.*

Kisacanin, B. Integral Image Optimizations for Embedded Vision Applications. Mar. 24-26, 2008, 2008 IEEE Southwest Symposium on Image Analysis and Interpretation, pp. 181-184.*

Derpanis, K.G. Integral image-based representations. Jul. 14, 2007, pp. 1-6.*

Ke, Y., Sukthankar, R., and Hebert, M. Efficient Visual Event Detection using Volumetric Features, Oct. 17-21, 2005, Tenth IEEE International Conference on Computer Vision, 2005. ICCV 2005., vol. 1, pp. 166-173.*

Cho, J., Mirzaei, S., Oberg, J., and Kastner, R. FPGA-Based Face Detection System Using Haar Classifiers, Feb. 22-24, 2009, FPGA '09, pp. 103-111.*

Liu, D., Sun, P., and Yin, Y., How to Speed-up an Embedded Face Detector, 2009, Information Engineering and Computer Science, pp. 1-4.*

F. Crow, "Summed-Area Tables for Texture Mapping", Computer Graphics, vol. 18, No. 3, Jul. 1984, pp. 207-212.

P. Viola, et al., "Rapid Object Detection Using a Boosted Cascade of Simple Features", Proc. IEEE, Accepted Conference on Computer Vision and Pattern Recognition, vol. 1, pp. 511-518, Dec. 2001.

Chinese Office Action dated Jun. 27, 2012 in Chinese Patent Application No. 10072067 together with an English translation thereof.

Wei-Su Wong et al.: "A 100Mhz Hardware-Efficient Boost Cascaded Face Detection Design", Department of Computer Science, National Tsing Hua University, Hsin-Chu, Taiwan, R.O.C., 2009 IEEE, pp. 3237-3240.

H.J.W. Belt: "Storage Size Reduction for the Integral Image", Philips Research Eindhoven, Koninklijke Philips Electronics N.V. 2008, Technical note TN-2007/00784.

Extended European Search Report, dated Oct. 29, 2013, in counterpart European Patent Application No. 10196123.3.

* cited by examiner

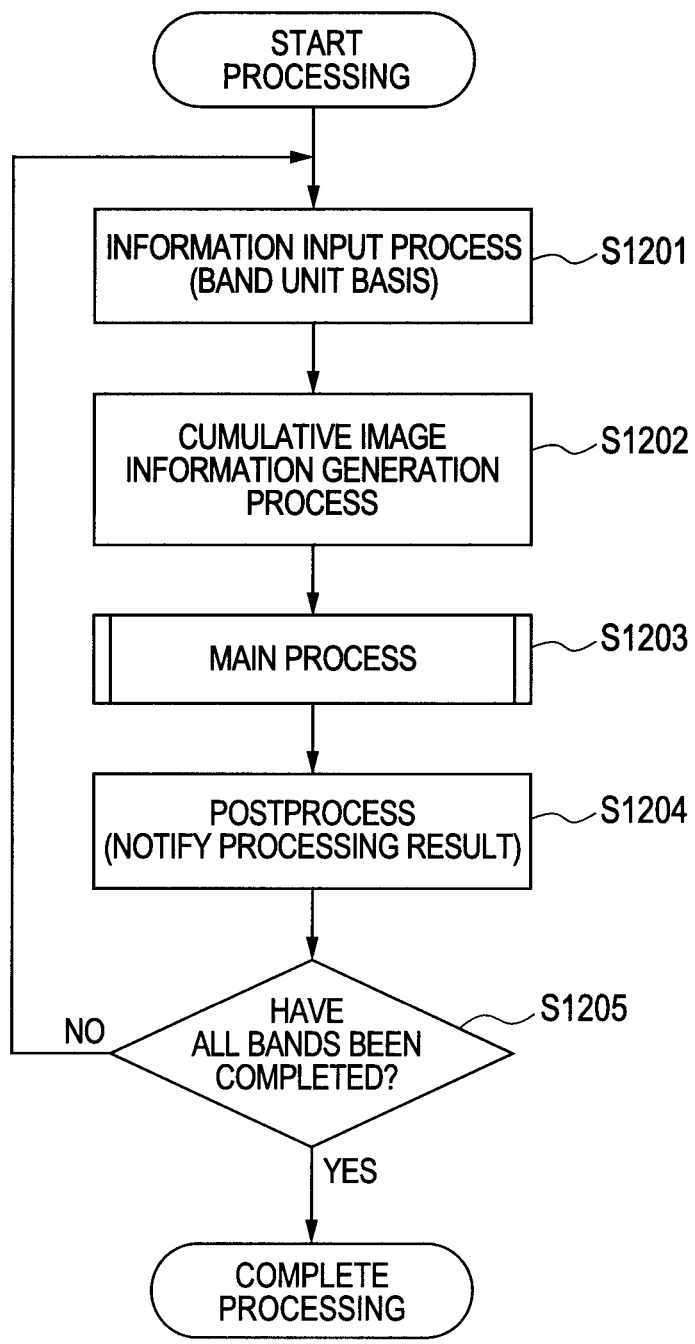

INFORMATION PROCESSING APPARATUS AND METHOD FOR CLASSIFIER-BASED OBJECT DETECTION

BACKGROUND OF THE INVENTION

1. Field of the Invention

The present invention relates to an information processing apparatus and an information processing method.

2. Description of the Related Art

Conventionally, in the information processing field, information of multi-dimensional arrays has frequently been processed. Among them, in a part of processing and statistical processing pertaining to image processing, image recognition and image synthesis, the total sum value of elements in a range of a specific area is often acquired and used.

In recent years, in the field of computer graphics, a concept of cumulative image information with respect to original input image information has been proposed; this concept is referred to as the rectangular, summed-area table (e.g., see F. C. Crow, "Summed-Area Tables for Texture Mapping", Computer Graphics, 1984).

According to the above document, the total sum value of elements in a rectangular area in an input image is calculated according to Equation (1). Here, it is provided that the summed-area table is a two-dimensional array with a size (the identical number of elements) identical to that the input image and the pixel value at the coordinate position (x, y) in the input image is I(x, y), C(x, y) is acquired as the total sum value thereof.

$$C(x, y) = \sum_{\substack{x' \leq x \\ y' \leq y}} I(x', y') \quad (1)$$

For example, as illustrated in FIG. 2, a value C(x, y) of the summed-area table 20 at a position (x, y) is the total sum value of elements in a rectangle whose diagonal vertices are the origin position (0, 0) and the position (x, y) in an original input image 10. In the above document, description is made such that the origin position of the summed-area table is located at the lower left corner of the image.

This method can acquire the sum of pixel values I(x, y) in any rectangular area disposed horizontally or vertically on the input image only by referring to four positions in the summed-area table. For example, as illustrated in FIG. 3, the total sum $C(x_0, y_0; x_1, y_1)$ of pixel values in the rectangular area whose diagonal vertices are $(x_0, y_0)$ and $(x_1, y_1)$ can be acquired by calculating Equation (2).

$$C(x_0, y_0; x_1, y_1) = C(x_0-1, y_0-1) - C(x_0-1, y_1) - C(x_1, y_0-1) + C(x_1, y_1) \quad (2)$$

Therefore, this method can acquire the total sum of pixel values in any rectangular area in the input image at high speed.

In the field of image recognition, the integral image has been proposed as cumulative image information equivalent to the summed-area table (e.g., see P. Viola, M. Jones, "Rapid Object Detection using a Boosted Cascade of Simple Features", Proc. IEEE Conf. on Computer Vision and Pattern Recognition, Vol. 1, pp. 511-518, December 2001). A fast face detecting process has been realized by an image processing apparatus. This apparatus includes a configuration that cascade-connects weak classifiers including a plurality of rectangular filters employing the integral image.

However, in order to acquire the total sum of the elements in the rectangular area in the processing window using the cumulative image information, cumulative image information corresponding to the entire pixel positions in the input image information should be prepared. This offers a problem of consuming a lot of memory resources for holding the cumulative image information.

The present invention is made in view of such a problem. It is an object of the present invention to reduce memory resources necessary to hold the cumulative image information.

SUMMARY OF THE INVENTION

In order to achieve the object, the present invention provides an information processing apparatus comprising a reading unit that reads input image information, a generating unit that generates cumulative image information for pixels corresponding to pixel positions of a prescribed pixel pattern in the read input image information, and a storing unit that stores the generated cumulative image information.

Further features of the present invention will become apparent from the following description of exemplary embodiments with reference to the attached drawings.

BRIEF DESCRIPTION OF THE DRAWINGS

FIG. 14 is a flowchart pertaining to the entire processing of an information processing apparatus of a second embodiment.

DESCRIPTION OF THE EMBODIMENTS

Preferred embodiments of the present invention will now be described in detail in accordance with the accompanying drawings.

First Embodiment

First, a method of recognizing a face will be described as an example of pattern recognition by an image processing apparatus of this embodiment.

Figure 4:
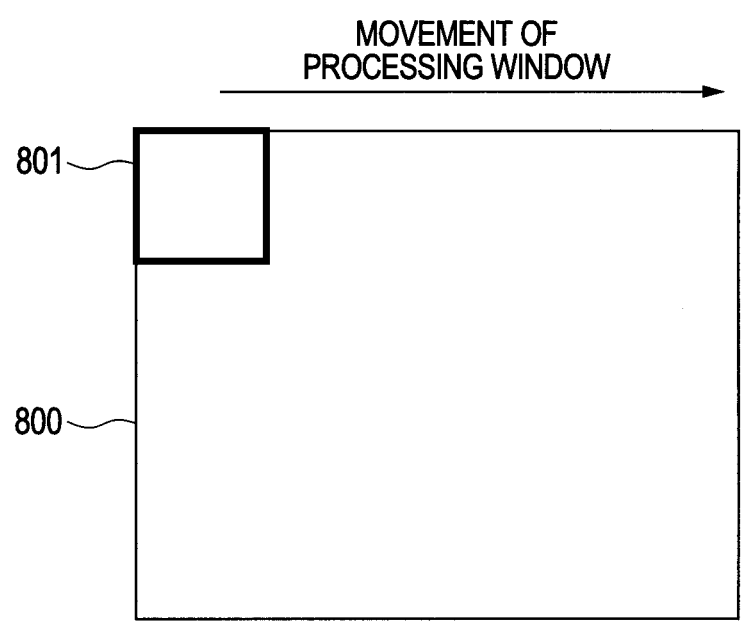
FIG. 4 is a diagram illustrating an example of a pattern recognition process.

FIG. 4 is a diagram illustrating an example of a pattern recognition process. The image processing apparatus moves a rectangular area 801 having a specific size as a processing window in an input image 800 to be processed. The image processing apparatus determines whether or not the face of a person is included in the processing window 801 at each destination of the movement.

Figure 5:
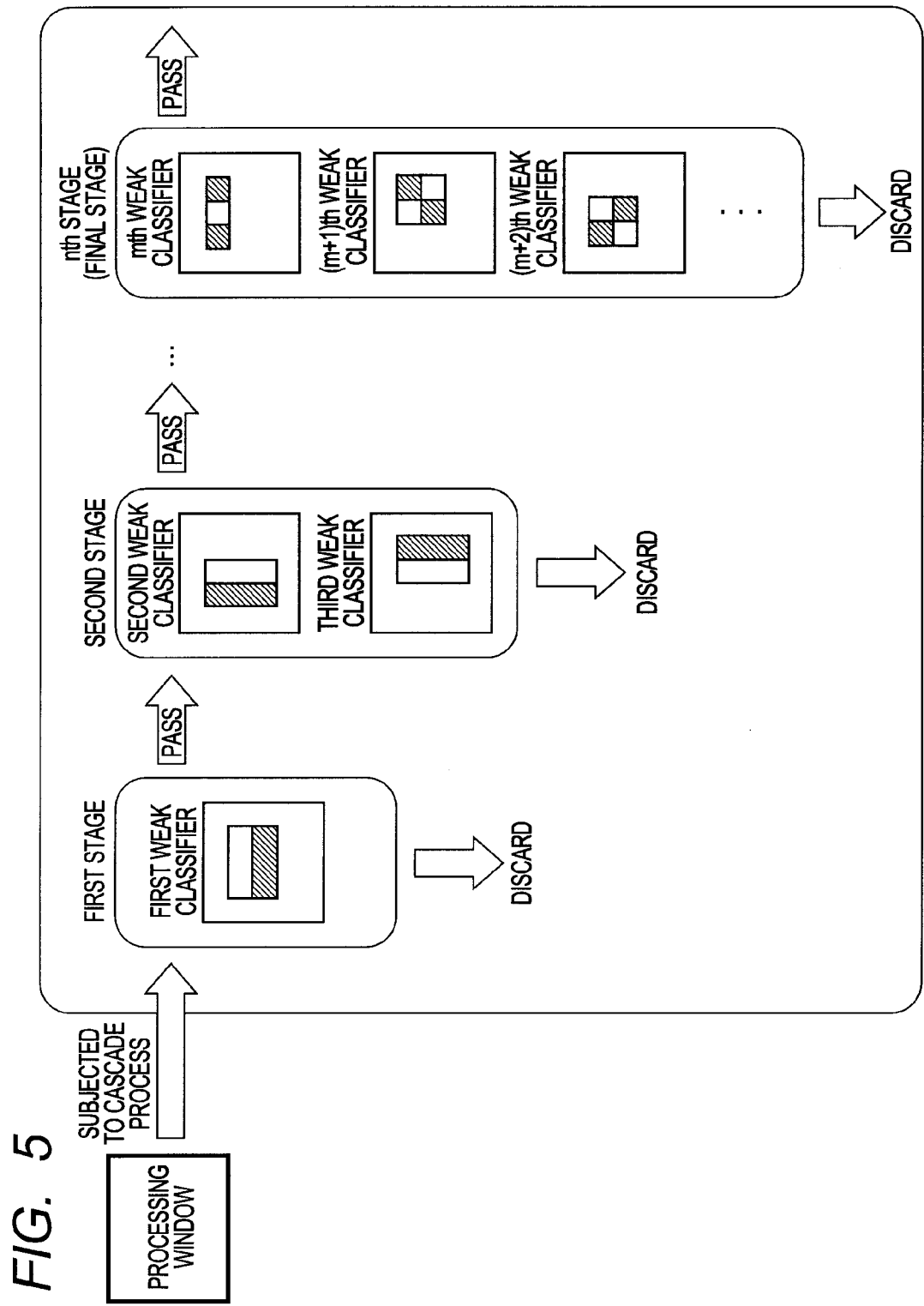
FIG. 5 is a diagram illustrating an example of a configuration of a pattern identifier including a plurality of weak classifiers.

FIG. 5 is a diagram illustrating a configuration where the image processing apparatus performs face detection in the processing window 801 at the position of each destination. The image processing apparatus performs the face detection in a certain processing window according to a plurality of stages.

Here, different combinations of weak classifiers are assigned to the respective stages. Each weak classifier is for detecting a so-called Haar-like feature, and configured by combining rectangular filters. The stages are assigned with respective sequential turns. The image processing apparatus performs processes at the respective stages according to the sequential turns. For example, the image processing apparatus performs determination at a first stage, then performs determination at a second stage thereafter, and subsequently performs determination at a third stage.

This image processing apparatus employs a configuration where the numbers of weak classifiers assigned to the respective stages are different from each other. The image processing apparatus uses the weak classifiers having a pattern assigned to each stage, and determines whether or not the face of a person is included in the processing window. When it is determined that the face of a person is not included in the processing window in a certain stage, the image processing apparatus does not perform determination on the processing window at this position in the stages at and after this sequential turn (a cascade process is terminated.). In a case where the image processing apparatus determines that the face of a person is included in the processing window by determination in the stage of the final sequential turn, the apparatus determines that the face of a person is included in this processing window.

Figure 1:
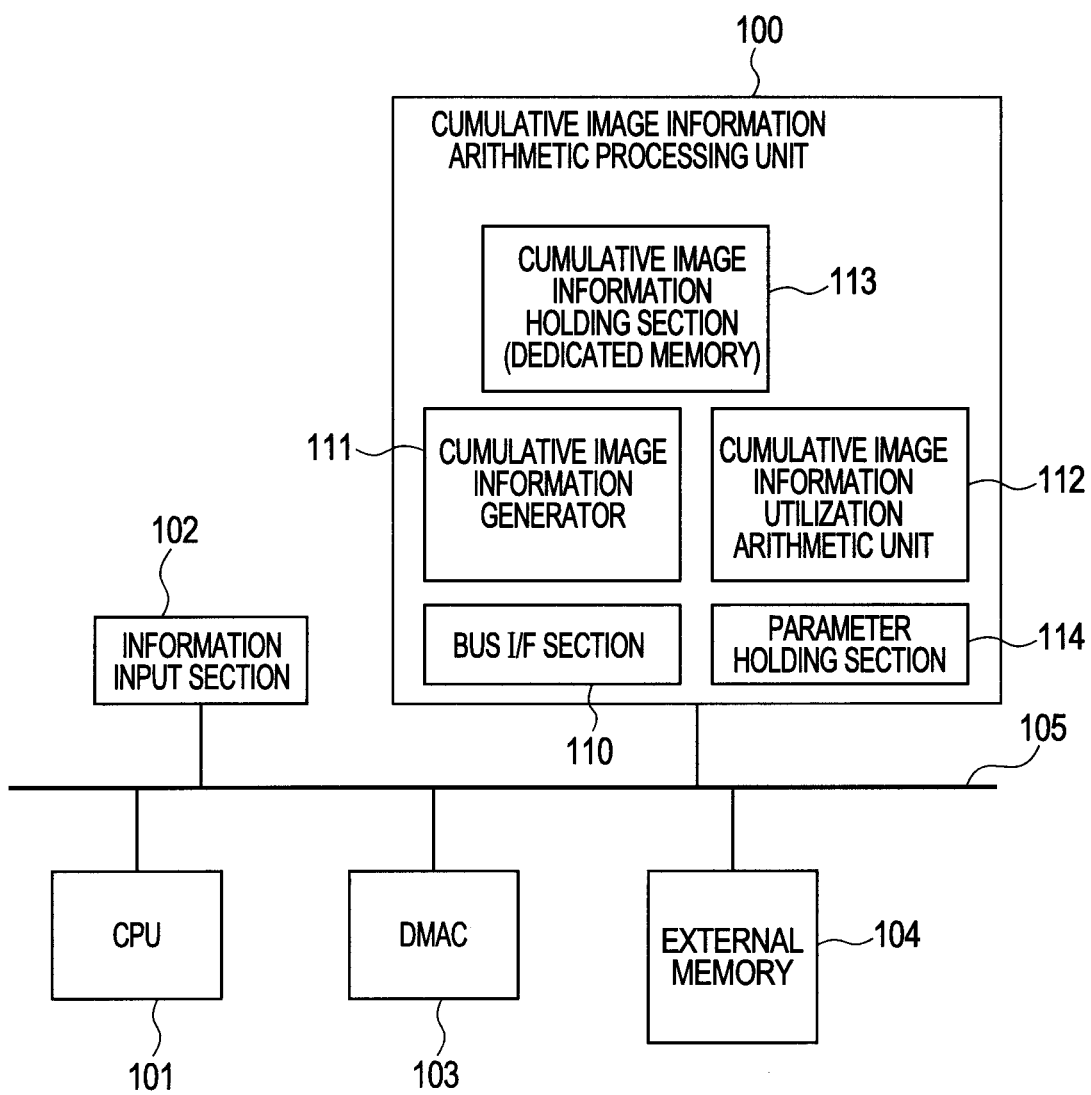
FIG. 1 is a diagram illustrating an example of a hardware configuration of an information processing apparatus.
Figure 2:
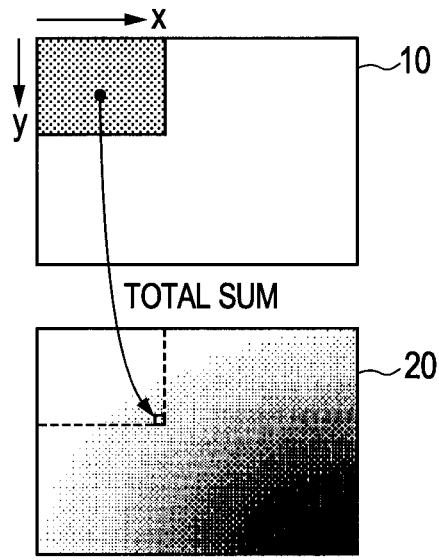
FIG. 2 is a diagram illustrating a relationship between input image information and cumulative image information.

FIG. 1 is a diagram illustrating a hardware configuration of the information processing apparatus according to one embodiment of the present invention.

As illustrated in FIG. 1, this information processing apparatus includes a cumulative image information arithmetic processing unit 100, a CPU (Central Processing Unit) 101, an information input section 102, a DMAC (direct memory access controller) 103, an external memory 104 and a bus 105. The devices (hardware) are connected to each other via the bus 105, and configured to be capable of communication.

The CPU 101 controls operation of the information processing apparatus and performs programs stored in the external memory 104.

The information input section 102 receives input image information (image data). For example, the information input section 102 captures the input image information to be processed into the apparatus. The information input section 102 may include an image sensor, such as a CCD, or may be an I/F device receiving input image information from an external device via a network. Here, in this embodiment, two-dimensional array image information (including not only image information, such as RGB image and grayscale image, but also image information having been subjected to a primary differential filter and processed image information) is referred to as the input image information.

The DMAC 103 transfers a data having a prescribed size between the external memory 104, the information input section 102 and the cumulative image information arithmetic processing unit 100 in independent and continuous manner according to operative instructions by the CPU 101. The DMAC 103 notifies the CPU 101 of an interrupt signal via the bus 105 after the transfer instructed by the CPU 101 has been completed.

The external memory 104 may be a storage device, such as a ROM, a RAM and a HDD, and stores a program having been read based on the operation of the CPU 101 and a data to be stored for a long time. The external memory 104 is a storing area used for a work area where the CPU 101 performs various processes. The external memory 104 may be a storing area used as an area for holding the input image information as necessary.

The cumulative image information arithmetic processing unit 100 includes a bus I/F section 110, a cumulative image information generator 111, a cumulative image information utilization arithmetic unit 112, a cumulative image information holding section 113 and a parameter holding section 114.

The cumulative image information generator 111 generates cumulative image information at a limited position with respect to the input image information input from the information input section 102. The cumulative image information holding section 113 holds the generated cumulative image information. Here, in this embodiment, the two-dimensional array information, such as the summed-area table and the integral image, is referred to as the cumulative image information.

The cumulative image information utilization arithmetic unit 112 reads cumulative image information held on the cumulative image information holding section 113 according to a request by the CPU 101, performs various processes and returns results of the processes to the CPU 101.

The cumulative image information holding section 113 includes a dedicated memory with a memory size of Sbuf for holding the cumulative image information, and a memory controller controlling input and output to and from the dedicated memory. The parameter holding section 114 holds information pertaining to settings of the elements in the cumulative image information arithmetic processing unit 100.

In this embodiment, the cumulative image information arithmetic processing unit 100, the CPU 101, the information input section 102, the DMAC 103, the external memory 104 and the bus 105 realize functions in the information processing apparatus and processing pertaining to a flowchart, which will be described later.

This information processing apparatus may include input devices for inputting various instructions, which may be a mouse, a keyboard, a touch panel device and a button, in addition to the aforementioned hardware configuration. Further, this information processing apparatus may include an output device outputting various pieces of information, which may be a liquid crystal panel or an external monitor.

Figure 6:
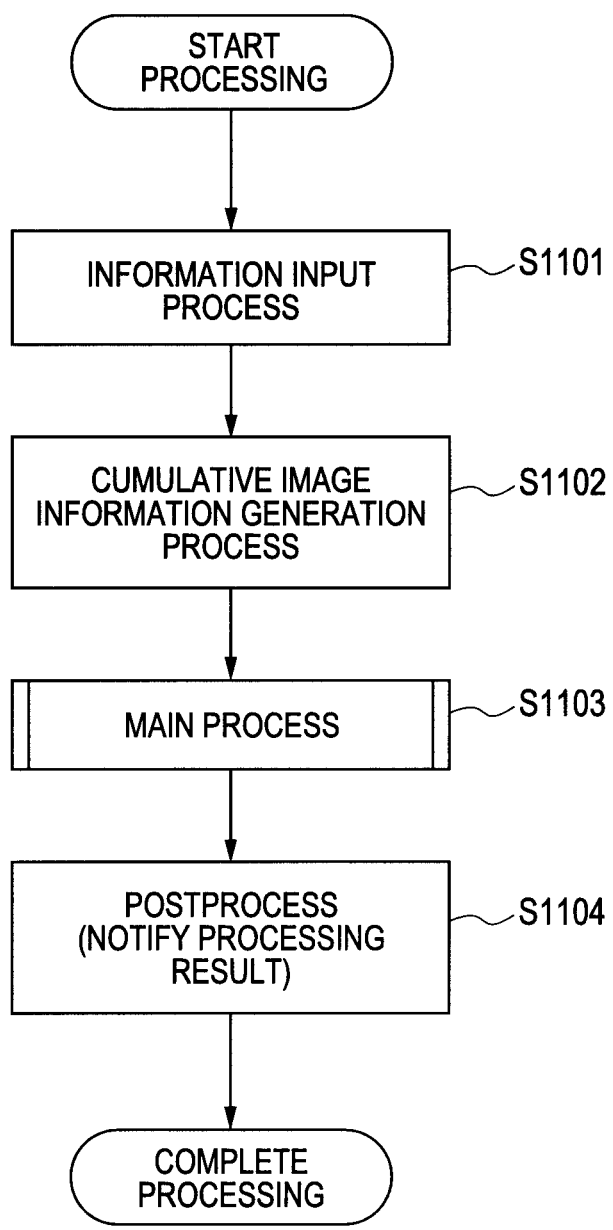
FIG. 6 is a flowchart pertaining to the entire processing of the information processing apparatus.

Next, referring to FIG. 6, processing in the information processing apparatus will be described. FIG. 6 is a flowchart pertaining to the processing of the information processing apparatus.

In this information processing apparatus, a user operation or a trigger from an external device (not illustrated) starts the processing.

In step S1101, the information input section 102 reads the input image information, and stores the input image information on the external memory 104 as necessary.

In step S1102, the cumulative image information arithmetic processing unit 100 uses the input image information stored in the external memory 104 and thereby generates the cumulative image information. In a process of generating the cumulative image information, the cumulative image information arithmetic processing unit 100 generates the cumulative image information at a limited position with respect to the input image information. The CPU 101 sets the DMAC 103, and successively transfers the input image information from the external memory 104 to the cumulative image information arithmetic processing unit 100.

Figure 7:
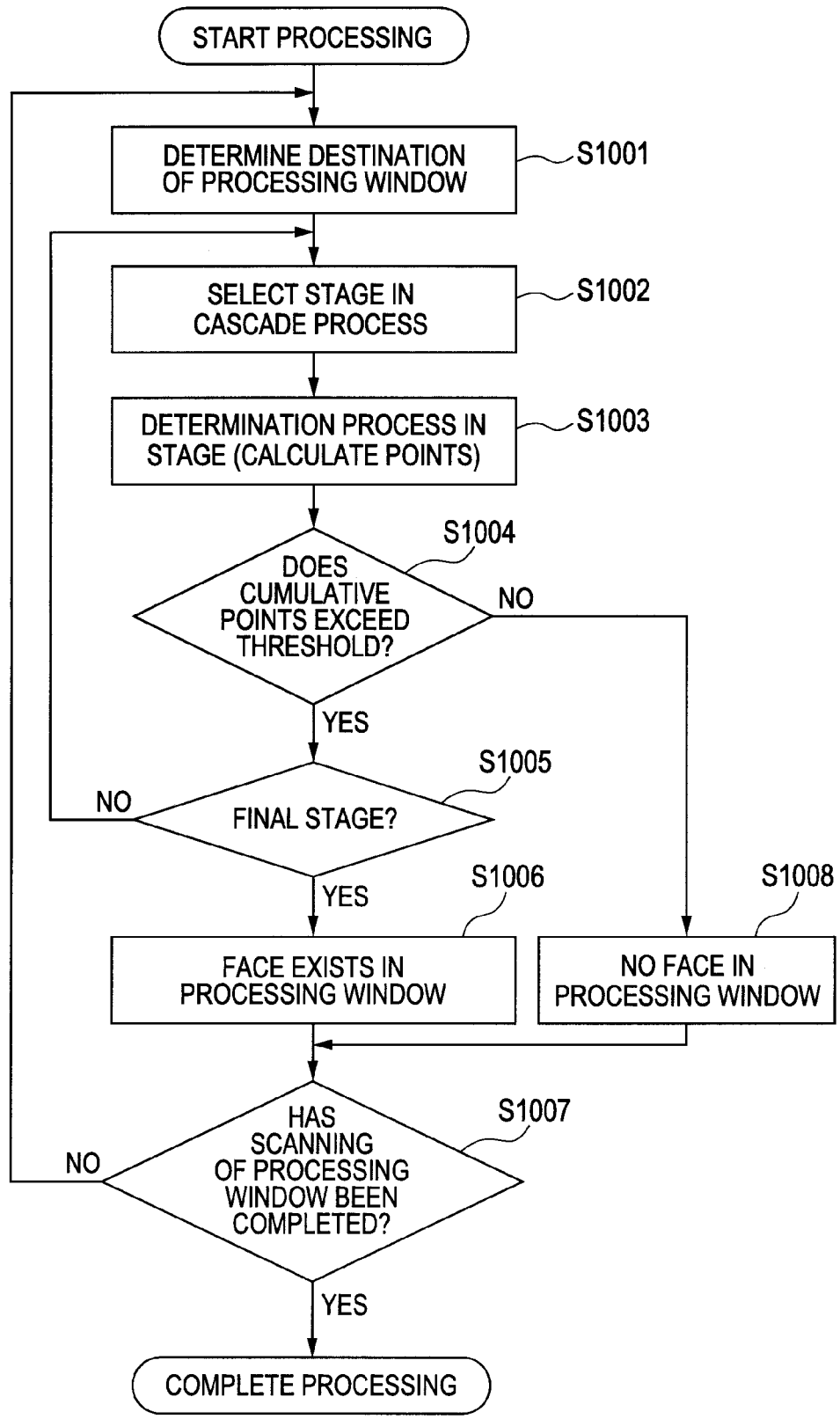
FIG. 7 is a flowchart pertaining to the processing in the pattern identifier.

In step S1103, when the cumulative image information is stored in the cumulative image information holding section 113, the cumulative image information arithmetic processing unit 100 performs a main process illustrated with reference to FIG. 7, which will be described later. In this information processing apparatus, a pattern identification process to be illustrated in FIG. 7 is performed as the main process. Another process using the cumulative image information may be performed. In the pattern identification process illustrated in FIG. 7, in a determination process in step S1003, which will be described later, each weak classifier detects a prescribed Haar-like feature. Accordingly, it is necessary to acquire the total sum values of elements in each rectangular area. Here, the cumulative image information utilization arithmetic unit 112 can calculate the total sum value in the elements in the rectangular area at high speed. The operation of the cumulative image information utilization arithmetic unit 112 will be described with reference to FIG. 11.

In step S1104, after the main process, such as the pattern identification process, has been finished, the cumulative image information arithmetic processing unit 100 performs postprocess. The postprocess includes a process of notifying the external device and a user of results of processes, and various processes using the result of recognition.

This embodiment employs the configuration where the processes are successively performed. However the configuration is not limited thereto. For example, in a case where the input image information is not used as it is in the postprocess in this information processing apparatus, the information processing apparatus may concurrently perform steps S1101 and S1102. That is, the information processing apparatus may repeat steps S1101 and S1102 for every input of one line, or may successively perform the processes on one element input unit basis in a manner of a pipeline. At this time, the CPU 101 may set the DMAC 103 to transfer each element of the input image information from the information input section 102 to the cumulative image information arithmetic processing unit 100 automatically and successively. The postprocess indicates processes in and after step S1103 that use the cumulative image information.

FIG. 7 is a flowchart pertaining to the main process (a face detection process in this embodiment). Here, the main process will be described with reference to FIG. 7.

In step S1001, the cumulative image information arithmetic processing unit 100 disposes the processing window to be processed on the input image information. Basically as with the details illustrated in FIG. 4, the cumulative image information arithmetic processing unit 100 scans at regular intervals in vertical and horizontal directions from an end of the input image information, and thereby selects while sequentially moving in the processing window in a comprehensive manner. For example, the cumulative image information arithmetic processing unit 100 selects the processing window by raster-scanning the input image information.

In step S1002, the cumulative image information arithmetic processing unit 100 selects a stage in the cascade process in order to determine whether or not the face of a person is included in the processing window with respect to the selected processing window. This determination is made using the plurality of stages as described with reference to FIG. 5. Accordingly, the cumulative image information arithmetic processing unit 100 sequentially selects the stage where determination is to be made from the first one.

In step S1003, the cumulative image information arithmetic processing unit 100 performs the determination process of the selected stage. In this determination process, the cumulative image information arithmetic processing unit 100 calculates the cumulative points. The details of this determination process will be described later.

In step S1004 the cumulative image information arithmetic processing unit 100 determines whether the cumulative points exceed a threshold predetermined for each stage or not. If the points do not exceed the threshold (the case of NO), the cumulative image information arithmetic processing unit 100 determines that the face of a person is not included in the processing window (step S1008), and the processing proceeds to step S1007. On the other hand, if the cumulative points exceed the threshold predetermined for each stage (the case of YES), the cumulative image information arithmetic processing unit 100 proceeds to step S1005.

In step S1005, the cumulative image information arithmetic processing unit 100 determines whether the present stage is the final stage or not. If the present stage is not the final stage (the case of NO), the cumulative image information arithmetic processing unit 100 returns the processing to step S1002. In step S1002, the cumulative image information arithmetic processing unit 100 selects the next stage, and performs a process according to the newly selected determination process. On the other hand, if the present stage is the final stage (the case of YES), the cumulative image information arithmetic processing unit 100 finally determines that the face of a person is included in the present processing window (step S1006). At this time, the cumulative image information arithmetic processing unit 100 thus determines that the face of a person is included in the present processing window.

In step S1007, the cumulative image information arithmetic processing unit 100 determines whether the processing window to be determined is the final processing window in the input image information or not. If this window is not the final processing window (the case of NO), the cumulative image information arithmetic processing unit 100 returns the processing to step S1001. In step S1001, the cumulative image information arithmetic processing unit 100 selects the next processing window, and performs the processes in and after step S1002. On the other hand, if this window is the final processing window, the cumulative image information arithmetic processing unit 100 finishes the main process (face detection process) with respect to the input image information.

Next, the details of the determination process in each stage will be described.

Each stage is assigned with one or more patterns of weak classifiers. This assignment is made in a learning process according to a boosting learning algorithm, such as the AdaBoost.

Therefore, the cumulative image information arithmetic processing unit 100 determines whether a face is included in the processing window based on the weak classifiers of the pattern assigned to each stage.

Figure 3:
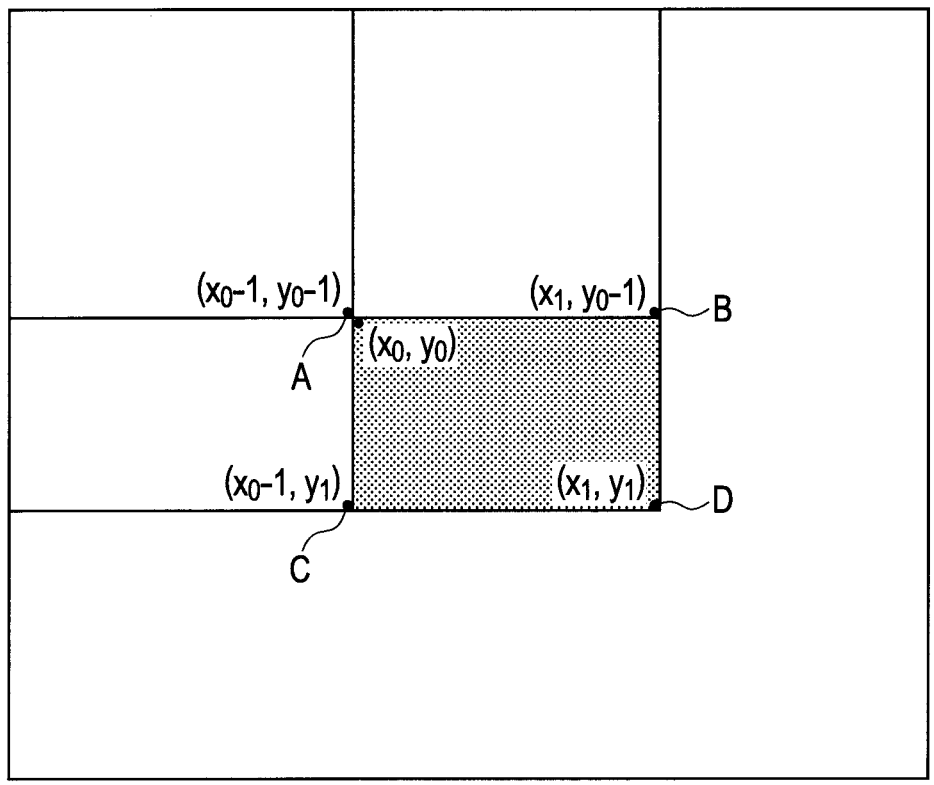
FIG. 3 is a diagram illustrating a concept of acquiring the total sum value of elements in a rectangular area using the cumulative image information.

More specifically, in each stage, the cumulative image information arithmetic processing unit 100 causes the weak classifier of each pattern assigned to each stage to calculate the feature amount in a plurality of rectangular filters (hereinafter referred to as "local area") in the processing window. The feature amount, which is used at this time, is a value capable of identifying an object calculated using the total of pixel values in the local area, such as the sum or average of the pixel values in each local area. The sum of the pixel values in this local area (the total sum value of the element) is calculated at high speed using the cumulative image information (the summed-area table or the integral image) with respect to the input image, as illustrated in FIG. 3.

Next, the cumulative image information arithmetic processing unit 100 calculates the relative value (ratio or difference) of the calculated feature amount. Here, the difference value of the feature amounts is calculated. It is determined whether the face of a person is included in the processing window based on the difference value. More specifically, the cumulative image information arithmetic processing unit 100 determines whether or not the calculated difference value is larger (or smaller) than the threshold set by the weak classifier of the pattern used for the determination. The cumulative image information arithmetic processing unit 100 determines the presence or absence of the face of a person in the processing window according to the result of this determination.

The determination at this time is based on the weak classifier of each pattern, but is not the determination for the stage. Thus, the cumulative image information arithmetic processing unit 100 separately performs determinations based on the weak classifiers of the entire patterns assigned to each stage, and acquires the respective results.

Next, the cumulative image information arithmetic processing unit 100 calculates the cumulative points at the stage. Here, the weak classifier of each pattern is separately assigned with points. If the cumulative image information arithmetic processing unit 100 determines that the face of a person is included in the processing window, the cumulative image information arithmetic processing unit 100 refers to the points assigned to the weak classifier of the pattern used at this time, and adds the points to the cumulative points of this stage. Thus, the cumulative image information arithmetic processing unit 100 calculates the total of the added points as the cumulative points at the stage. If the cumulative points at this stage exceed a specific threshold (cumulative point threshold), the cumulative image information arithmetic processing unit 100 determines that there is a possibility that the face of a person is included in the processing window in this stage, and then performs the process in the next stage. On the other hand, if the cumulative points do not exceed the cumulative point threshold in the stage, the cumulative image information arithmetic processing unit 100 determines that the face of a person is not included in the processing window in this stage, terminates the cascade process and does not perform the processes of the stages thereafter.

According to such a configuration, high speed pattern identification is realized. In a case where appropriate learning has been made, the weak classifier can be used as a pattern identifier for what is other than the face.

[Description of Cumulative Image Information]

The cumulative image information in this embodiment is a piece of cumulative image information, whose position for generation is limited, among pieces of cumulative image information corresponding to the integral image (or the summed-area table).

Figure 8A:
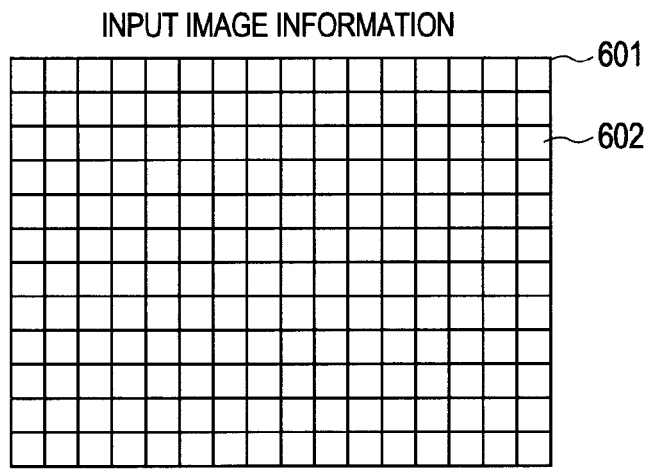
FIGS. 8A, 8B and 8C show a diagram illustrating correspondence between the input image information and the cumulative image information.
Figure 8B:
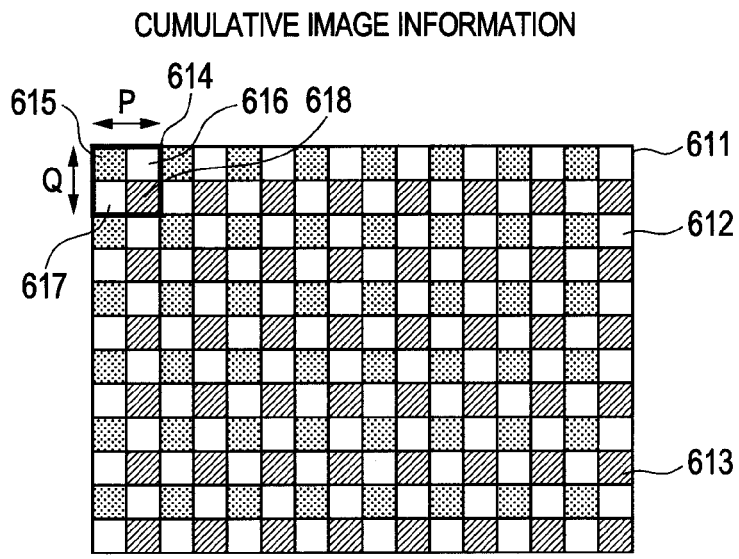
Figure 8C:
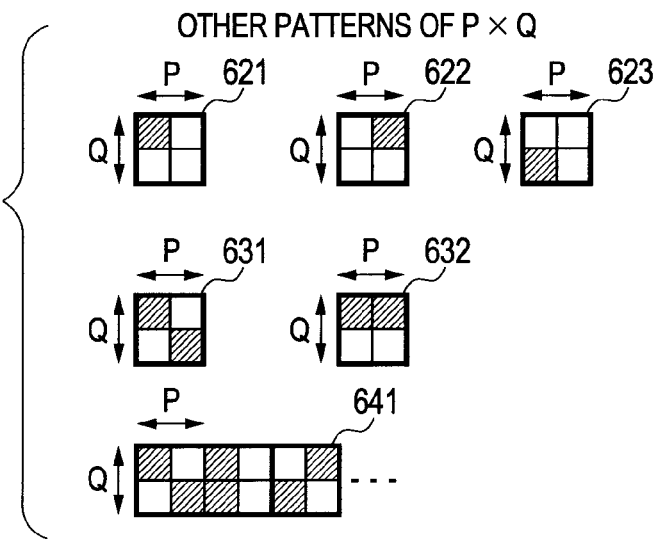

FIGS. 8A to 8C are diagram illustrating the relationship between the input image information and the cumulative image information corresponding to the position (position of each pixel configuring the input image information) of each element of the input image information.

FIG. 8A illustrates the input image information 601 and a pixel 602, which is one pixel in the input image information 601.

FIG. 8B illustrates cumulative image information 611 corresponding to the position of each pixel of the input image information 601. For example, the cumulative image information corresponding to the pixel 602 is the cumulative image information 612.

In this embodiment, the cumulative image information generator 111 divides the cumulative image information 611 with respect to units of P pixels in the horizontal direction and Q pixels in the vertical direction (P and Q are positive integers; at least one of them is larger than one), and generates the cumulative image information at any position that is at least one and less than P×Q from among P×Q pixels. More specifically, in this embodiment, the cumulative image information generated by the cumulative image information generator 111 is cumulative image information 618 positioned at the lower right corner in a P×Q pixel pattern 614. It is indicated that the cumulative image information 613 is cumulative image information to be generated.

FIG. 8C illustrates examples of pixel patterns. In this embodiment, the cumulative image information generator 111 generates the cumulative image information 618 positioned at the lower right corner based on the P×Q pixel pattern 614. However, this is not limited thereto. For example, the cumulative image information generator 111 may generate the cumulative image information based on the pixel patterns from the pixel pattern 621 to the pixel pattern 623 generating any one piece of cumulative image information from the cumulative image information 615 to the cumulative image information 617. Further, for example, the cumulative image information generator 111 may generate the cumulative image information, based on the pixel patterns, such as pixel patterns 631 and 632, generating a position where those from the cumulative image information 615 to the cumulative image information 618 are combined. Moreover, for example, the cumulative image information generator 111 may generate the cumulative image information based on a pixel pattern 641 generating irregular position on a P×Q pixel unit basis. That is, the cumulative image information generator 111 (cumulative image information arithmetic processing unit 100, in a broader sense) generates the cumulative image information based on the pixel pattern indicating the position of a pixel as an indicator among a plurality of pixels.

[Description of Cumulative Image Information Generator]

The configuration and operation of the cumulative image information generator 111 will be described with reference to FIGS. 9 and 10. Here, the cumulative image information generator 111 generates the cumulative image information based on the pixel pattern 614, where P=2 and Q=2, illustrated in FIGS. 8A to 8C.

Figure 9:
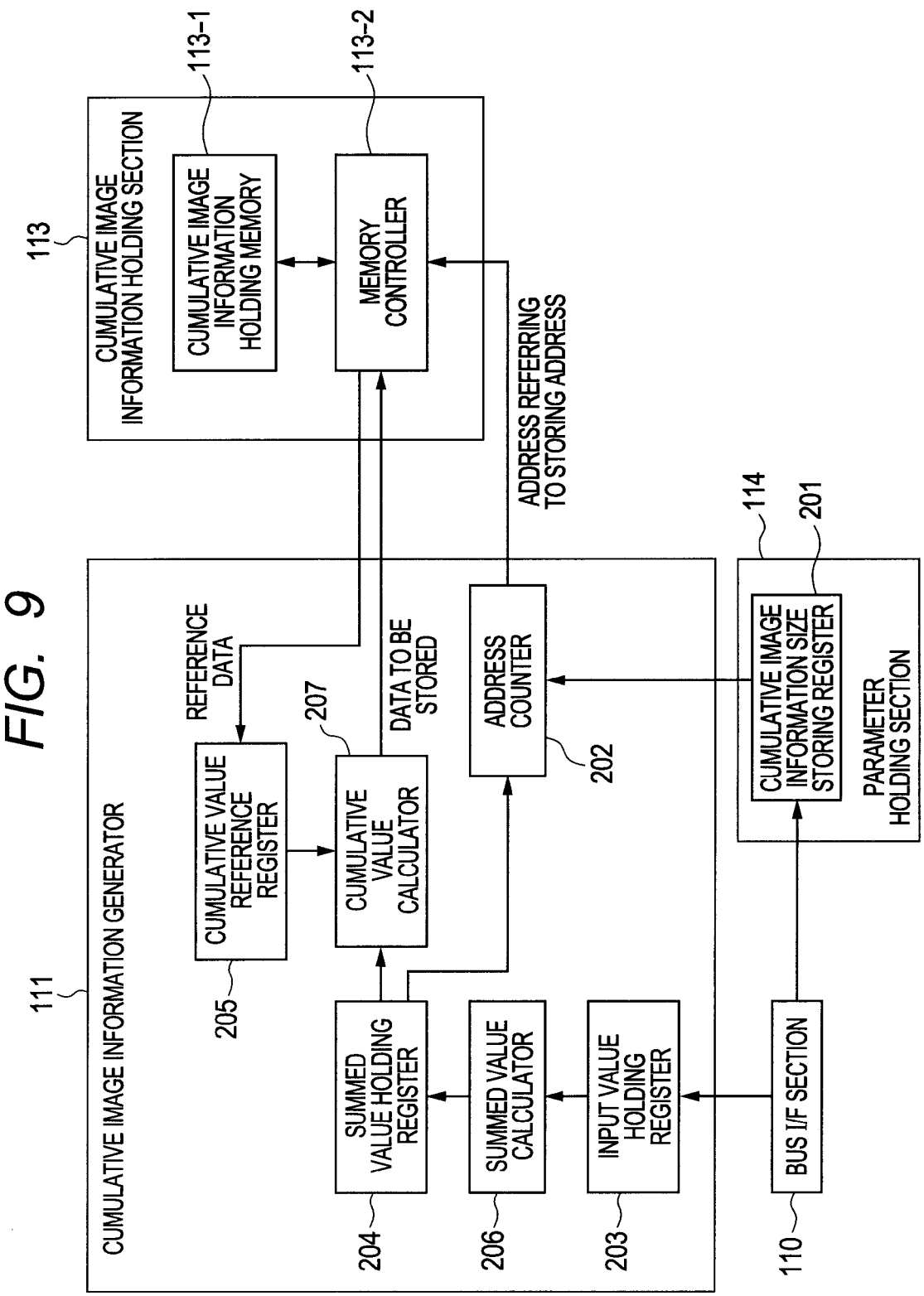
FIG. 9 is a diagram illustrating a configuration of a cumulative image information generator.
Figure 10:
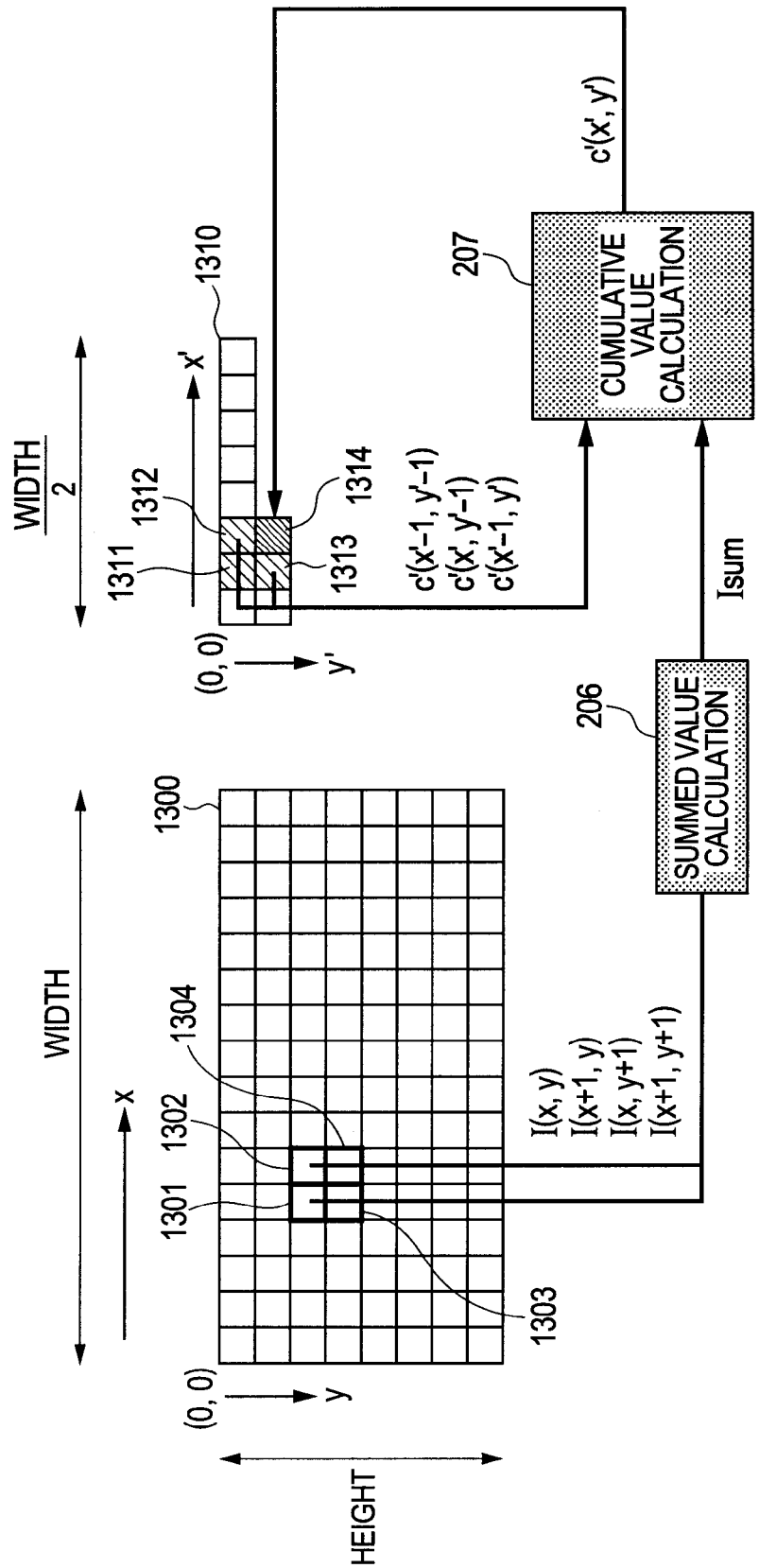
FIG. 10 is a diagram illustrating a relationship between the input image information and the generated cumulative image information.

FIG. 9 is a diagram illustrating the configurations of the bus I/F section 110, the cumulative image information generator 111, the cumulative image information holding section 113 and the parameter holding section 114. FIG. 10 is a diagram illustrating an example of a configuration of generating the cumulative image information from the input image information.

The parameter holding section 114 includes a cumulative image information size storing register 201. The cumulative image information size storing register 201 stores the size of the cumulative image information to be generated by the cumulative image information generator 111. A value is set to the cumulative image information size storing register 201 via the bus I/F section 110 by the CPU 101 before the processing is started.

The cumulative image information generator 111 includes an address counter 202, an input value holding register 203, a summed value holding register 204, a cumulative value reference register 205, a summed value calculator 206 and cumulative value calculator 207.

The input value holding register 203 temporarily holds the element value of the input image information input via the bus I/F section 110 according to control of the CPU 101 or the DMAC 103. Here, for example, the image data (P=2 and Q=2) of those from the pixel 1301 to the pixel 1304 in FIG. 10 is sequentially transmitted as the element values. Here, provided that the position of the pixel 1301 is (x, y), the positions of those from the pixel 1302 to the pixel 1304 are positions defined by (x+1, y), (x, y+1), (x+1, y+1), respectively.

The summed value calculator 206 calculates the summed value from the pixel 1301 to the pixel 1304 held in the input value holding register 203. The summed value holding register 204 holds the calculated summed value.

Here, provided that the pixel value of each position is represented by I(x, y), the summed value calculator 206 calculates the summed value Isum according to Equation (3).

$$I_{sum} = \sum_{j=0}^{Q-1}\sum_{i=0}^{P-1} I(x+i, y+j) \tag{3}$$

The address counter 202 calculates the memory address of the cumulative image information holding section 113, where the cumulative image information is to be stored, every time the summed value is input to the summed value holding register 204, based on the size of the cumulative image information stored in the cumulative image information size storing register 201. For example, when the first summed value (the origin position of the cumulative image information) is input, the address counter 202 resets the address to be stored to zero or a prescribed offset value, and increments the storing address by one until the end.

The address counter 202 calculates the reference address of the cumulative image information around the present position necessary to acquire the cumulative image information (in other words, the cumulative image information generated with respect to a pixel pattern adjacent to the pixel pattern at the destination). For example, it is provided that the position of the present cumulative image information 1314 is (x', y'). In this case, the positions from the cumulative image information 1311 to cumulative image information 1313 to which the address counter 202 refers are (x'−1, y'−1), (x', y'−1), (x'−1, y'), respectively. Thus, the address counter 202 calculates the addresses in the cumulative image information holding section 113 corresponding to these positions, from the address of the present position. However, if the present position is on a first line, the cumulative image information 1311 and the cumulative image information 1312 do not exist. If the present position is on a first column, the cumulative image information 1313 does not exist. In this case, the address counter 202 outputs information indicating that it is out of the area of the cumulative image information to the cumulative image information holding section 113.

The address counter 202 supplies the memory controller 113-2 with the calculated address. The memory controller 113-2 performs writing and reading in the address concerned in the cumulative image information holding memory 113-1.

The cumulative image information C'(x'−1, y'−1), C'(x', y'−1) and C'(x'−1, y') read by the memory controller 113-2 is temporarily held in the cumulative value reference register 205. However, if the information out of the area of the cumulative image information is input, the memory controller 113-2 sets zero as a read value.

The cumulative value calculator 207 calculates the cumulative image information at the present position. The cumulative value calculator 207 calculates the cumulative image information at the present position according to the summed value Isum with P×Q pixels held in the summed value holding register 204 and the cumulative image information held in the cumulative value reference register 205. Provided that the cumulative image information at the present position to be acquired is C'(x', y'), the cumulative value calculator 207 calculates the cumulative image information C'(x', y') according to Equation (4).

$$C'(x',y') = I_{sum} + C'(x'-1,y') + C'(x',y'-1) - C'(x'-1,y'-1) \tag{4}$$

The memory controller 113-2 then writes the calculated cumulative image information C'(x', y') to the position at the destination address calculated by the address counter 202.

In this embodiment, the cumulative image information generator 111 employs the configuration of performing calculation with limitation on the position where the cumulative image information is generated and of holding the cumulative image information in the cumulative image information holding section 113. However, this is not limited thereto. For example, the cumulative image information generator 111 may temporarily generate the cumulative image information corresponding to the entire input pixel positions, and subsequently thin the cumulative image information at unnecessary positions, and thereby generate the cumulative image information. The cumulative image information holding section 113 may hold the thus generated cumulative image information. An analogous advantageous effect of reducing necessary memory resources can be attained also according to such a configuration.

[Description of Cumulative Image Information Utilization Arithmetic Unit]

Figure 11:
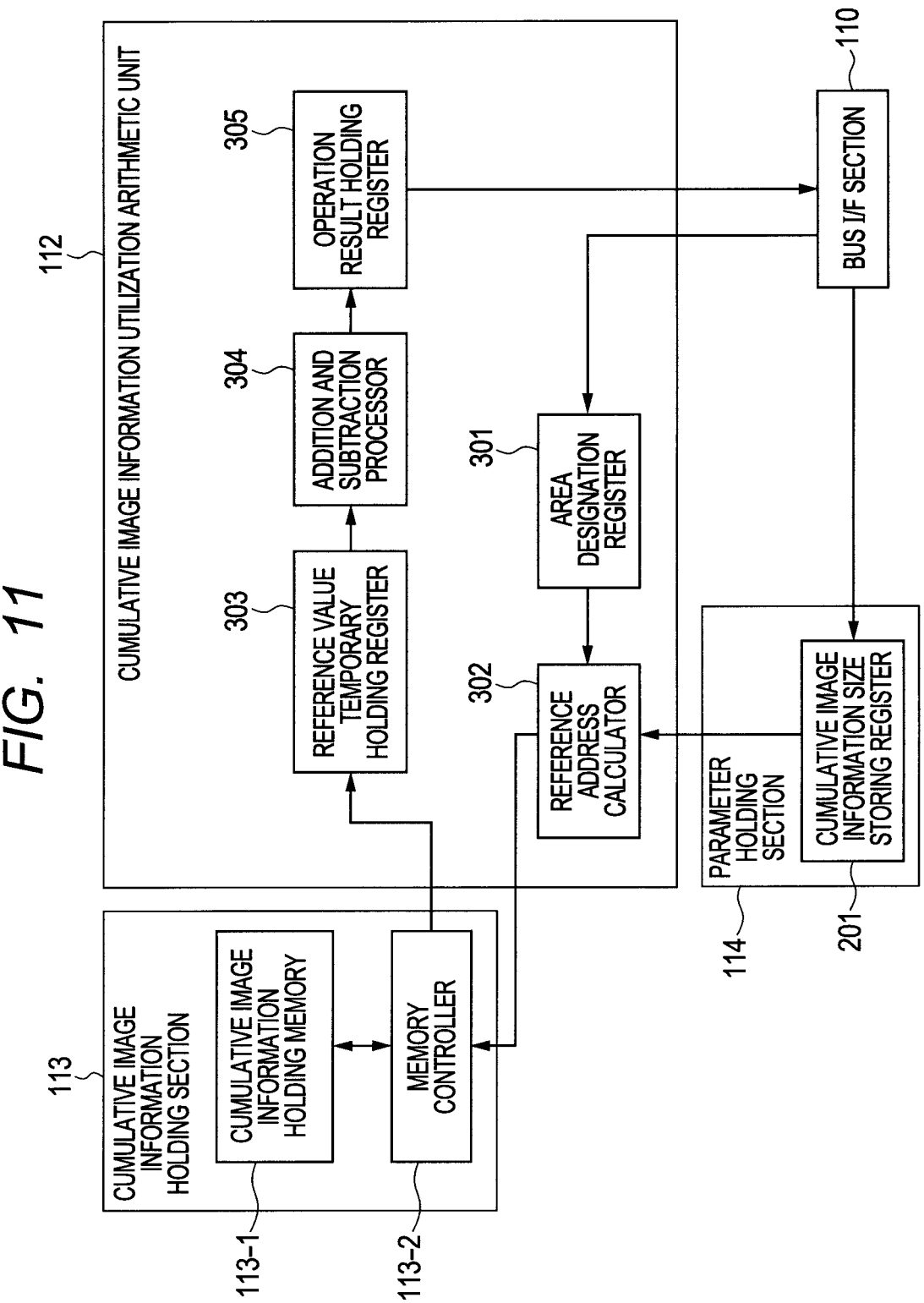
FIG. 11 is a diagram illustrating a configuration of a cumulative image information utilization arithmetic unit.
Figure 12:
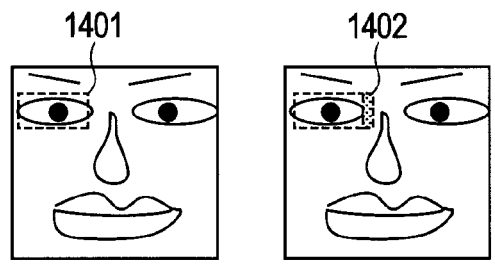
FIG. 12 is a diagram for illustrating a correlation to positional deviation.

The cumulative image information utilization arithmetic unit 112 will be described with reference to FIGS. 11 and 12. FIG. 11 is a diagram illustrating the configurations of the cumulative image information utilization arithmetic unit 112, the cumulative image information holding section 113, the parameter holding section 114 and the bus I/F section 110. In this embodiment, the information processing apparatus performs the pattern identification process as postprocess using the result of operation using the cumulative image information (for example, see FIG. 7). Accordingly, the necessary result of operation is the total sum value of the elements in each local area of the weak classifier that is relatively arranged in the processing window and detects the Haar-like feature. The total sum value of the elements in any local area of the input image can be calculated by referring to four points of cumulative image information (the element value), as illustrated with reference to FIG. 3.

The cumulative image information utilization arithmetic unit 112 includes an area designation register 301, a reference address calculator 302, a reference value temporary holding register 303, an addition and subtraction processor 304 and an operation result holding register 305. Note that what is identical to those illustrated in FIGS. 1 and 9 are assigned with the identical symbols. The CPU 101 presets the size of the cumulative image information via the bus I/F section 110 before the cumulative image information is generated.

Here, the CPU 101 identifies the local area where the total sum value of the elements in the processing window is to be acquired. The CPU 101 then converts the coordinates of the two diagonal vertices (relative coordinates) in the local area into the absolute coordinates with reference to the origin of the cumulative image information, for example (x0, y0) and (x1, y1) in FIG. 3. The CPU 101 sets the absolute coordinate values to the area designation register 301 via the bus I/F section 110.

When a trigger of starting operation is issued from the CPU 101 via the bus I/F section 110, the reference address calculator 302 refers to the absolute coordinate values set in the area designation register 301, and calculates the addresses where the cumulative image information at the positions A, B, C and D illustrated in FIG. 3 are stored. The reference address calculator 302 sequentially passes the calculated addresses to the memory controller 113-2.

The memory controller 113-2 accesses the cumulative image information holding memory 113-1 based on the received addresses, and sets the sequentially acquired four points of cumulative image information to the reference value temporary holding register 303.

When the values of the four points are held in the reference value temporary holding register 303, the addition and subtraction processor 304 performs prescribed addition and subtraction processes using the valves of the four points. Here, the prescribed addition and subtraction processes are operation according to Equation (2). The operation result holding register 305 holds the result of the operation. The CPU 101 grasps the completion of the operation by notification of interruption via the bus I/F section 110 or reference of a completion flag. The CPU 101 acquires the value of the operation result holding register 305, and uses the acquired value as the total sum value of the elements in the set local area.

The entire adder-subtractors used in the addition and subtraction processor 304 employ positive values with Nbuf bits as input and output. Provided that the original coordinates before conversion on the input image information are (Xsrc, Ysrc) and the coordinates on the corresponding cumulative image information are (X'dst, Y'dst), the CPU 101 converts the coordinates of the local area of the input image information to the coordinates of the cumulative image information according to Equations (5) and (6).

$$X'_{dsr} = \frac{X_{src}}{P} \quad (5)$$

$$Y'_{dst} = \frac{Y_{src}}{Q} \quad (6)$$

Here, the CPU 101 approximates X'dst and Y'dst at the adjacent coordinates by dropping the fractional portion thereof. The thereby acquired total sum value of the elements in the local area deviates. Accordingly, an algorithm allowing the deviation is applied. One of the algorithms allowing the deviation is the recognition process described in the aforementioned document "Rapid Object Detection using a Boosted Cascade of Simple Features".

For example, provided that P=2 and Q=2, the amount of deviation of the coordinates for acquiring the total sum value of the elements in the recognition process is one at a maximum. It is regarded that this may adversely affect the result of the calculation.

Thus, it will be described that there is little influence owing to the deviation, with reference to FIG. 12. In comparison of the total sum value of the elements in the local area 1401 without deviation and that of the local area 1402 where deviation occurs by one pixel at the right end, the local area 1402 includes the local area 1401 and thereby it is expected that correlation is high. Further, it can be understood that the larger the size of the local area, the smaller the influence owing to the deviation is. Moreover, in actuality, a learning process has been performed using various samples of recognition targets. Accordingly, the deviation by a few pixels can be supported. Therefore, the influence exerted by about one pixel of deviation is limited to special cases, such as a case where the size of the local area is extremely small and a case where an extreme input value is taken on a boundary of deviation of the local area.

Thus, it is considered that the influence of deviation of coordinates is small. However, in order to further eliminate the influence owing to deviation of coordinates as much as possible, a method of preliminarily considering the position of cumulative image information generated on learning as much as possible is effective. For example, provided that P=2, Q=2, the position of the local area used in the recognition process on learning is limited to the position that takes even numbers both in horizontal and vertical directions. Accordingly, the deviation can preliminarily be considered in the learning stage, thereby allowing reduction in accuracy to be suppressed as much as possible.

The information processing apparatus according to the first embodiment has thus been described above. Here, in generation of the cumulative image information, which is referred to as the summed area table or the integral image, from the input image information, the cumulative image information corresponding to the entire positions of the input image information is typically acquired and stored in a buffer. More specifically, provided that the width of the input image information (the number of pixels in the horizontal direction) is Ximg, the height (the number of pixels in the vertical directions) is Yimg and bit-accuracy of each pixel is Nimg bits (note: a positive integer), the bit accuracy necessary for the cumulative image information is calculated according to Equation (7). The buffer size Sbuf necessary to store the entire cumulative image information is calculated according to Equation (8).

$$N_{buf} \geq \log_2((2^{Nimg}-1)X_{img}Y_{img}) \quad (7)$$

$$S_{buf} = N_{buf}X_{img}Y_{img} \quad (8)$$

Accordingly, the buffer size Sbuf for storing the cumulative image information is also largely influenced by Ximg and Yimg, while being influenced by the bit accuracy Nbuf of one element. For example, in a case of employing a VGA size 8-bit grayscale image as an input image, Nimg=8, Ximg=640 and Yimg=480. Accordingly, the necessary bit accuracy is Nbuf=27 bits. Therefore, in a case where it is required to temporarily have the cumulative image information for the input image information of its entire region, it is necessary to prepare a memory area, such as RAM, as much as Nbuf× Ximg×Yimg=8,294,400 bits, thereby consuming a lot of memory resources.

In a case of performing such a process based on the cumulative image information on hardware, the amount of memory used for a buffer is a serious problem because of directly linking to the scale of a circuit. Even in a process on software, if Sbuf can be reduced, the process can be performed with a smaller amount of memory, thereby suppressing the amount of consumed resources.

For example, in the recognition process, in order to acquire the total sum of the pixel values in the local area in the processing window using the cumulative image information, it is required to prepare the cumulative image information corresponding to the entire pixel positions in the input image. Basically, Ximg and Yimg with sizes identical to those of the input image are required. Accordingly, it has been incapable of reducing the cumulative image information.

In view of such situations, in this embodiment the information processing apparatus includes the aforementioned configuration. Accordingly, the memory resources necessary to hold the cumulative image information can be reduced.

More specifically, in this embodiment, in order to reduce the buffer size Sbuf of the cumulative image information holding section 113 required to hold the cumulative image information used for the recognition process, the information processing apparatus divides information in a P×Q pixel unit basis, and generates only cumulative image information at a prescribed position and holds the generated information. Typically, the buffer size Sbuf is calculated according to Equation (8). However, in this embodiment, the buffer size S'buf is calculated according to Equation (9).

$$S'_{buf} = N_{buf} \frac{X_{img}}{P} \frac{Y_{img}}{Q} \quad (9)$$

For example, in a case where P=2 and Q=2, the buffer size Sbuf can be reduced to a quarter, thereby allowing the memory resources to be significantly reduced. The buffer size is thus reduced, and the total sum value of the elements of the input image information for its entire positions cannot be acquired accordingly. However, little influence exerts on the recognition process, as described above.

In the recognition process according to this embodiment, in order to recognize an object to be a target from the input image, the cumulative image information (integral image) is used and the feature amount (total sum value in elements in a partial area) is calculated at high speed. In this processing, this embodiment holds the cumulative image information for each element of the input image information at limited positions, thereby allowing the consumption of the memory resources to be reduced. Further, this embodiment preliminarily learns only cumulative image information at the limited positions where the feature amount is calculated, thereby enabling the consumption of the memory resources to be reduced while maintaining accuracy in recognition.

That is, according to this embodiment, in the process of acquiring the total sum of the pixel values in the local area in the processing window using the cumulative image information, the amount of buffer to be used for holding the cumulative image information can be reduced.

Second Embodiment

The first embodiment describes the method of storing the cumulative image information at the limited position for the input image information. On the other hand, the second embodiment describes a method of dividing the input image information on a band area basis, generating the cumulative image information for each divided area and storing the generated information.

Figure 13:
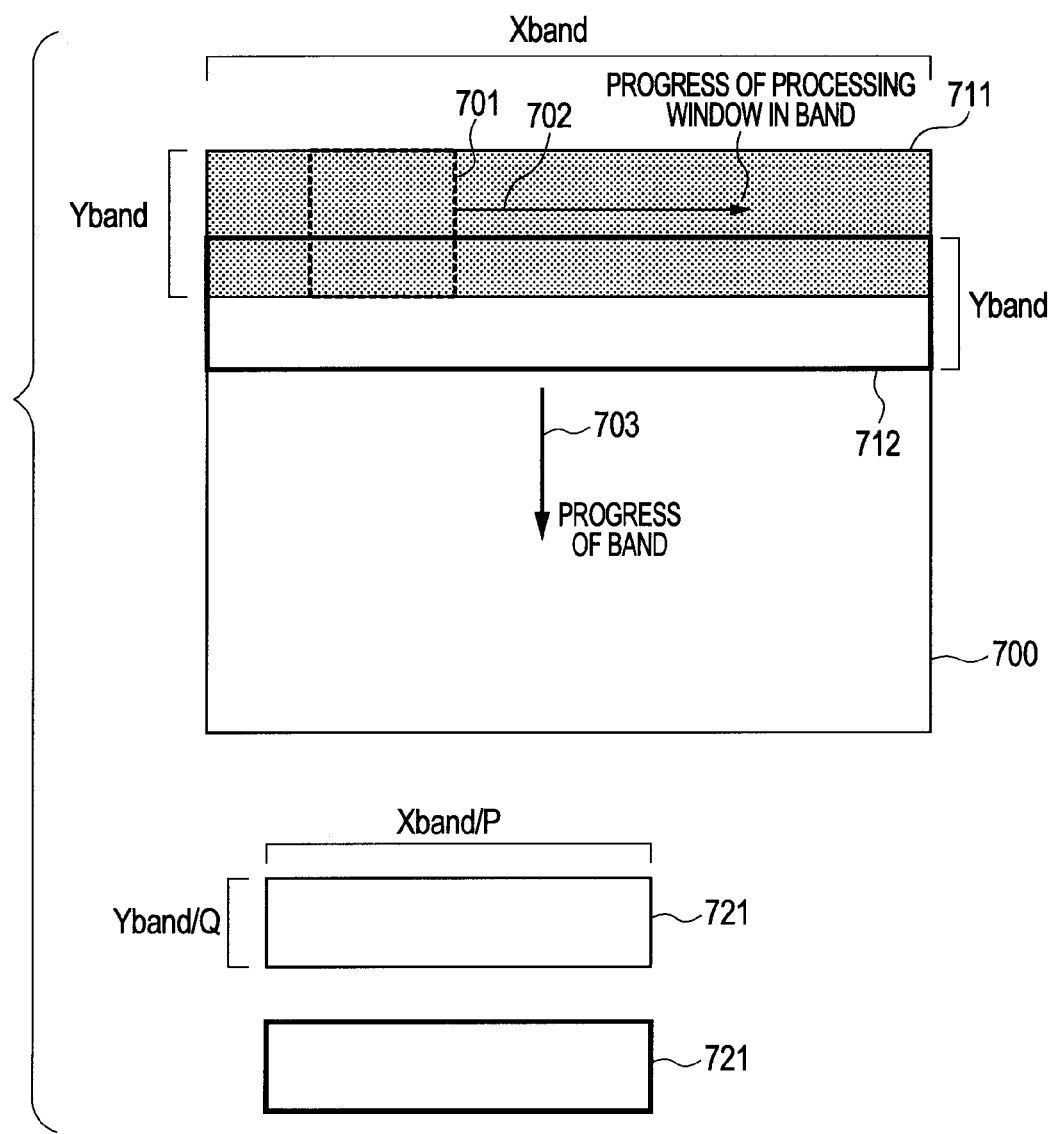
FIG. 13 is a diagram illustrating a band area.

FIG. 13 is a diagram illustrating an area of the input image information pertaining to the cumulative image information to be temporarily held when using the cumulative image information holding memory 113-1 of the cumulative image information holding section 113 as a band buffer.

The processing window 701 corresponds to the processing window illustrated in FIG. 4. What divides the input image information 700 into the bands is a band area 711 (rectangular area) and a band area 712 (rectangular area). The band area 711 is input at the beginning of the processing. The band area 712 is moved downwardly by a prescribed number of lines (here, one line).

The height of the band area 711 Yband is specified as at least of the height of the processing window area. This embodiment specifies that Yband has the height as large as that of the processing window area. The width Xband of the band area 711 is specified as that of the input image information. The cumulative image information at the limited position where the information is generated for each element in the band area 711 as with the first embodiment is cumulative image information 721. Further, the cumulative image information at limited position where the information is generated also for the band area 712 is cumulative image information 722. The cumulative image information 721 is held in the cumulative image information holding memory 113-1 of the cumulative image information holding section 113.

The first embodiment describes the method where the information processing apparatus limits the position, in which the cumulative image information is generated, on a P×Q pixel unit basis. This method can also be applied to this embodiment in an analogous manner. The width of the cumulative image information 721 is 1/P as large as the width Xband of the band area. The height of the cumulative image information 721 is 1/Q as large as the height Yband of the band area. The buffer size S"buf necessary to use the cumulative image information holding memory 113-1 of the cumulative image information holding section 113 as the band buffer is calculated according to Equation (10).

$$S''_{buf} = N_{buf} \frac{X_{band}}{P} \frac{Y_{band}}{Q} \quad (10)$$

Next, the entire processing of the information processing apparatus will be described with reference to FIG. 14. The description will be made focusing on the points different from the details described in the first embodiment.

More specifically, in the second embodiment, the points different from the configuration of the first embodiment are that the input image information is divided into the band areas and information is input (step S1201), and that the processing loops until the processes of the entire band area are completed (step S1205).

In this embodiment, the information processing apparatus divides the input image information in step S1201 into the band areas, and inputs the divided information. More specifically, the information processing apparatus has a configuration where the external memory 104 temporarily holds the input image information, and the CPU 101 or the DMAC 103 transmits an image data corresponding to the band area 711 at a first time and transmits an image data corresponding to the band area 712 at a second time.

Here procedures for advancing the band area in this embodiment are as illustrated in an arrow 703 in FIG. 13. The processing proceeds to the band area 711 and then to the band area 712, and subsequently proceeds to the lower band area up to the end. The procedures of advancing the processing window are as illustrated in an arrow 702 in FIG. 13. The method advances the processing from the left end to the right end in the band area. However, the method of advancing the band area and the processing window is an example among cases of dividing the area into the band areas. The information processing apparatus may advance the band area from the bottom to the top according to a sequential turn, and advance the band area randomly.

The successive processing represented herein is an exemplary one. The information processing apparatus may perform the processing in a manner of a pipeline so as to start the process of generating the cumulative image information when the input image information input from the information input section 102 accumulates for one band area in external memory 104.

In this embodiment, the information processing apparatus transmits the band area 712 again from the beginning after the process for the band area 711 is completed. However, the information processing apparatus may use the cumulative image information holding memory 113-1 as a ring buffer so as to transmit and process a data only for the difference.

The information processing apparatus according to the second embodiment has thus been described above. This embodiment allows the necessary memory resources in the cumulative image information holding memory 113-1 to be further reduced even in a case of dividing and processing the information into the band areas.

Third Embodiment

The first and second embodiments describe the configuration where the information processing apparatus generates the cumulative image information with respect to the two-dimensional array information. However, reduction in buffer size required to hold the cumulative image information can be realized for information of a multi-dimensional array that is at least third dimensional. Thus, in the third embodiment, a configuration where the information processing apparatus generates the cumulative image information will be described using an example of information of a three-dimensional array. The input image information of the three-dimensional array is, for example, moving image information. The moving image information has three-dimensional array information where one dimension of the temporal axis is added to the method of the two-dimensional array.

Figures 15A, 15B:
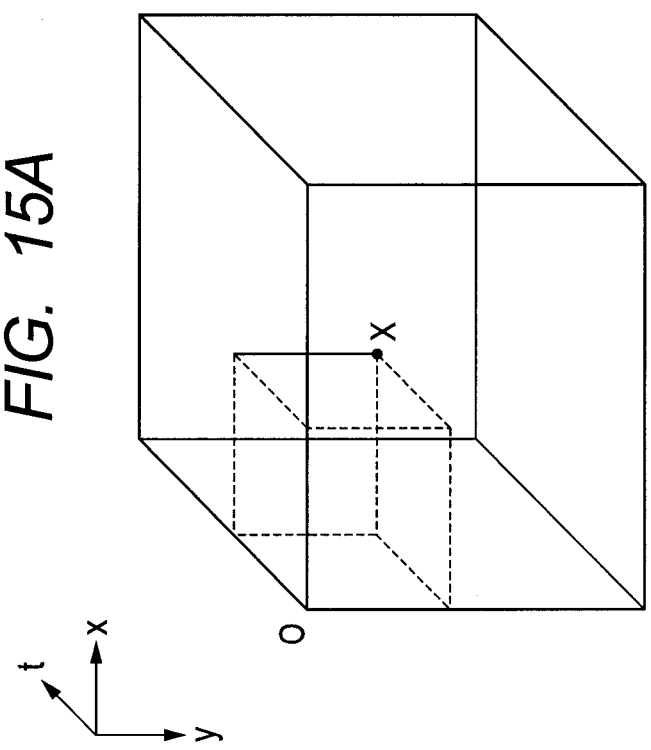
FIGS. 15A and 15B show a diagram illustrating three-dimensional cumulative image information as an example of multi-dimensional cumulative image information.

In FIG. 15A, the three-dimensional cumulative image information at the position of a point X is the total sum value of elements included in a cuboid where the origin and the point X in the three-dimensional input image information are diagonal vertices. The information processing apparatus is capable of acquiring the total sum value of the elements in the cuboid 1501 illustrated in FIG. 15B, using the three-dimensional cumulative image information. Here, it is provided that two coordinates representing diagonal vertices of the cuboid 1501 are (x0, y0, t0) and (x1,y1,t1). The cumulative image information at the coordinates A, B, C, D, E, F, G and H are described in (A). The information processing apparatus uses the cumulative image information and thereby calculates the total sum value $S_{3d}$ of the elements in the cuboid 1501 according to Equation (11).

$A:(x_0 1, y_0-1, t_0-1)$, $B:(x_1, y_0-1, t_0-1)$, $C:(x_0-1, y_1, t_0-1)$, $D:(x_1, y_1, t_0-1)$, $E:(x_0-1, y_0-1, t_1)$, $F:(x_1, y_0-1, t_1)$, $G:(x_0-1, y_1, t_1)$, $H:(x_1, y_1, t_1)$ (A)

$S_{3d} = H - D - F + B - (G - C - E + A)$ (11)

Here, this information processing apparatus applies the configuration described in the first and second embodiments to the three dimensional cumulative image information and holds the cumulative image information for the input image information at the limited position in the buffer size, thereby allowing the buffer size to be reduced.

Even with the cumulative image information for the multi-dimensional input image information, which exceeds three dimensions, if a hyper-cuboid is considered in an analogous manner, the cumulative image information for the input image information at the limited position is held in the buffer size, thereby allowing the buffer size to be reduced.

The configurations of the aforementioned embodiments allow the memory resources necessary for holding the cumulative image information to be reduced.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-292941, filed Dec. 24, 2009 which is hereby incorporated by reference herein in its entirety.

What is claimed is:

1. An information processing apparatus, comprising:
a reading unit constructed to read input image information;
a generating unit constructed to generate cumulative image information only for each of representative pixel positions which are only some of all pixel positions in the input image information read by the reading unit;
a storing unit constructed to store the cumulative image information for each of the representative pixel positions generated by the generating unit; and
a calculating unit constructed to calculate a feature amount of a local area in the input image information using the cumulative image information stored for predetermined representative pixel positions which prescribe the local area, without using cumulative image information for any pixel positions other than the representative pixel positions.

2. The information processing apparatus according to claim 1, wherein the calculating unit sequentially moves the local area in the input image information, and calculates the feature amount of the moved local area.

3. The information processing apparatus according to claim 1, further comprising a determination unit constructed to determine whether the input image information in the local area includes image information representing an object or not, based on the feature amount corresponding to the local area.

4. The information processing apparatus according to claim 1, wherein the reading unit divides the input image information and reads the divided information.

5. The information processing apparatus according to claim 1, wherein the reading unit reads moving image information as the input image information.

6. An information processing method carried out in an information processing apparatus, the method comprising:

reading input image information;

generating cumulative image information only for each of representative pixel positions which are only some of all pixel positions in the read input image information;

storing the cumulative image information for each of the generated representative pixel positions; and calculating a feature amount of a local area in the input image information using the cumulative image information stored for predetermined representative pixel positions which prescribe the local area, without using cumulative image information for any pixel positions other than the representative pixel positions.

7. A non-transitory computer-readable storage medium for storing a computer program that causes a computer to execute the information processing method according to claim 6.

8. The information processing apparatus according to claim 1, wherein the local area of which the feature amount is calculated by the calculating unit is selected based on the representative pixel positions.

* * * * *